Oct. 10, 1961  E. A. MASON ET AL  3,003,940
METHOD OF PREVENTING FOULING OF ANION SELECTIVE MEMBRANES
Original Filed Jan. 10, 1956  2 Sheets-Sheet 1

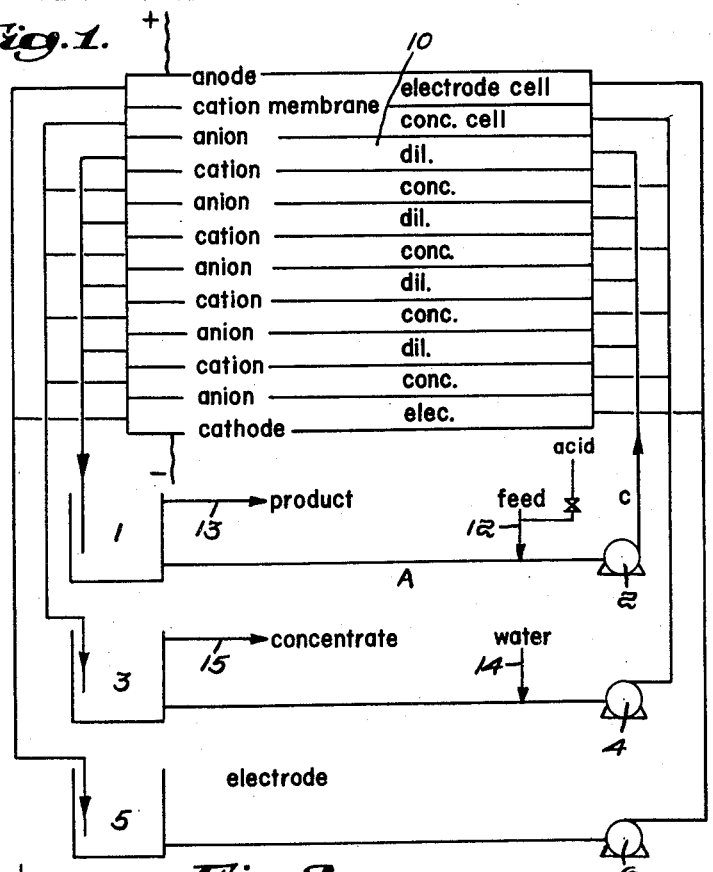

SCHEMATIC OF CONTINUOUS RECIRCULATING UNIT USED IN PERFORMANCE STABILITY TESTS ON SYRUP AND JUICE

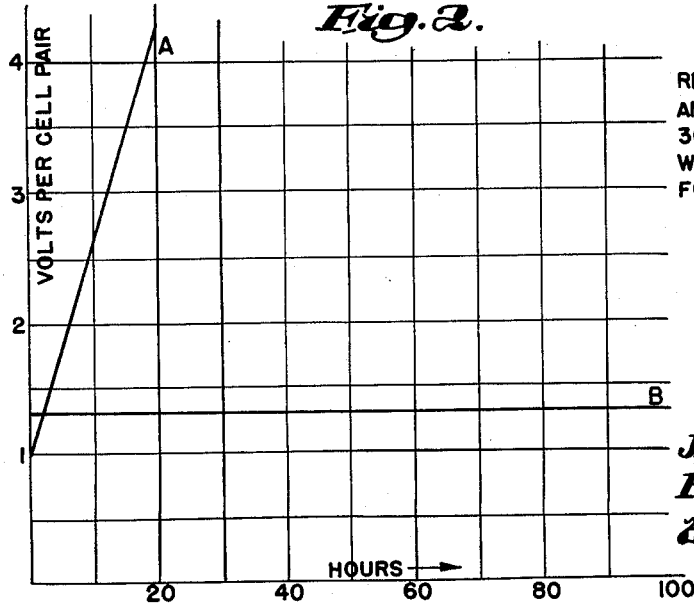

RELATION BETWEEN VOLTAGE AND TIME OF OPERATION FOR 30° BRIX CANE MOLASSES WITH VARIOUS TREATMENTS FOR A CURRENT OF 20 ma/cm²

Inventors:
Jacob A. Marinsky,
Edward A. Mason,
by Aaron Luskin
Attorney 3,003,940
METHOD OF PREVENTING FOULING OF ANION SELECTIVE MEMBRANES
Edward A. Mason, Lexington, Mass., and Jacob A. Marinsky, Eggertville, N.Y., assignors to Ionics, Incorporated, Cambridge, Mass., a corporation of Massachusetts
Continuation of abandoned applications Ser. No. 558,283 and Ser. No. 558,284, Jan. 10, 1956. This application Jan. 5, 1961, Ser. No. 80,957
12 Claims. (Cl. 204—180)

This invention relates to the method of preventing or controlling the fouling of membranes in the electrodialytic demineralization of aqueous solutions containing minor quantities of ionizable salts to be removed therefrom. More specifically, in the electrodialysis of aqueous solutions which include naturally occurring waters and aqueous organic solutions, the concentrating stream and/or the diluting stream are adjusted to a pH below 7 such as below 6.5 or 6 before or during the passage of the same through the electrodialysis system whereby the materials which precipitate in the concentrating stream or that become attached to or are imbedded in the membranes, or adjacent thereto are prevented from becoming attached to or imbedded in the membranes or are dissolved and removed therefrom.

This case is a continuation of applicants' combined copending cases Serial Nos. 558,283 and 558,284, both filed on January 10, 1956 and now abandoned.

The invention utilizes a membrane demineralizer having a set of diluting chambers (for the diluting stream) alternately disposed between a set of concentrating chambers (for the concentrating stream) and in addition, at least two terminal electrode chambers in which the current enters and leaves the demineralizer. Washing chambers, if so desired to minimize contamination from the products of the electrode chambers, may be interposed adjacent to the cathode and anode chambers of the cell and their respective concentrating and diluting chambers, and may be hydraulically independent or manifolded to diluting or concentrating chambers. The aforementioned chambers are separated by barriers of intrinsically electrolytically-conductive, hydraulically-impermeable, ion-selective permeable membranes, through which dissolved electrolytes are transferred from the diluting chambers to the concentrating chambers by means of a direct electric current in series across the membranes and the chambers defined between them. Such systems are more fully described in U.S. Patent No. 2,848,403, issued August 19, 1958, to N. W. Rosenberg, et al., and U.S. Patent No. 2,694,680 issued November 16, 1954, to Katz et al. Ion-selective membranes of the type employed in electrodialysis systems of the present case are fully disclosed in U.S. Patent No. 2,730,768 issued January 17, 1956, to John Thacher Clarke and U. S. Patent No. 2,636,851, issued April 28, 1953.

The operation of electrodialysis systems noted above frequently suffered from the fouling of the ion-exchange selective membrane by substances naturally occurring in the aqueous solutions treated or from degradation products formed in the organic solutions being treated. The fouling of membranes is evidenced by a considerable increase in resistance of the membrane demineralizer with time of operation, eventually often causing complete failure of operation. Frequent shutdowns with complete dismantling of the demineralizer became necessary in order to scrape, wash, or dislodge precipitates which were formed in the concentrating chambers adjacent the selective membranes, and more often imbedded within the membrane itself. This proved very costly, inefficient, and often ineffective, since the reformation and rebuilding of such precipitates began immediately even with accelerated pace upon reassembling and operation of the demineralizer. The aforesaid defect is an extremely serious one, and the solving of the problem of the elimination of this phenomenon often spells the difference between success and failure of the entire system.

The precipitation of salts in the concentrating stream of a multiple electrodialysis system, as noted hereinabove, can result when localized concentrations of precipitating species exceed their solubility limits. These localized regions may be at the surface of the membrane, within the pores of the membranes, or at obstructions in the flow path between the membranes. For example, carbonates of calcium and magnesium, hydroxides of magnesium and iron, and other salts of this general type particularly tend to form such precipitations because their solubilities decrease radically at even slight increases in pH values. For example, at room temperature, a pH of 2, ferric iron solubility is about 3000 p.p.m., but at a pH of 3, it is reduced to about 3 p.p.m. Similarly, magnesium bicarbonate solubility at a pH of 9 is about 1200 p.p.m., but at a pH of 10, it is reduced to about 12 p.p.m. Again, at a pH of 7 and in the presence of 100 p.p.m. of bicarbonate, calcium solubility is about 500 p.p.m., but at a pH of 8, it is reduced to 50 p.p.m. It will thus be evident that slight variations of pH values radically affect the solubility of salts present in most all aqueous solutions.

In normal operation of multi-chamber electrodialysis systems, very little pH changes are created in the central region of the concentrating stream. However, at high salt transfer rates the dissociation of water at the face of the anion-selective membranes in the diluting cells (i.e., H and $OH^-$), the transfer of the $OH^-$ ions through the membranes into the concentrating chambers can occur with pH values of about 7, thereby increasing the pH values at the localized regions referred to above. Since in most cases of economic interest high salt transfer rates with maximum allowable current densities are desired to minimize investment cost, any technique which will prevent precipitation with high salt transfer rates is of great economic importance.

The progressive increase of resistance during the demineralization of aqueous solutions as noted above is believed due to the constant buildup of precipitates of various compositions naturally occurring in said solutions which adhere to or imbed in the membrane, which cause the fouling referred to above. It will be apparent that the anion-selective membranes which facilitate the passage of anions of the diluting stream therethrough, such as in the case of naturally occurring waters, the $CO_3^=$, $SO_4^=$, $HCO_3^=$, etc., would be anions which, when in contact with polyvalent ions such as $Ca^{++}$, $Mg^{++}$, $Fe^{++}$, or $Fe^{+++}$, etc., present in the water of the concentrating stream and which have the electrical impulse to migrate towards the anion-selective membranes, produce the offending precipitates. The precipitates form in situ within the membranes themselves or cling tenaciously at the surface on the concentrating side thereof.

In the case of aqueous organic solutions, as for example, cane sugar, blackstrap molasses, cane sugar juice, crude soap, glycerine, and other aqueous organic and polyhydric alcohol solutions, the fouling of membranes referred to above, is believed, in addition, to be due to appreciable quantities of electrically charged chromophoric colloids usually of natural origin or protein degradation products, such as slightly ionizable amino acids, which clog up the membranes. The increase of anion membrane electrical resistance in these cases is due in part to exchange of large polymer anions from the diluting stream onto the anion membrane surface. As these polymer ions are too large to pass through the small membrane pores, and as they are driven to these walls, they soon coat anion membrane surfaces of the diluting cell and decrease the area available for passage of current.

Amphoteric compounds, sometimes referred to as zwitter-ions or dipolar ions as for example amino acids, are frequently found in polyhydric alcohols such as sucrose, dextrose, mannitol, etc. These compounds ionize as both acids and bases and in an electric field, such as is present in an electrodialysis system, they migrate to the anode in basic solutions and to the cathode in acid solutions. The adjustment of these solutions (polyhydric alcohols) by pH control to the isoelectric point, i.e., to a pH at which the acidic and basic ionization is equal and accordingly the molecules are essentially electrically neutral, is desirable in that stable operation results because the tendency to migrate in the electric field of said amphoteric materials in the solution is minimized or eliminated. Different materials obviously would have different isoelectric points and in the case of sucrose solutions produced from sugar cane by the usual mill operations, adjustment to a pH in the range of about 2 to about 5, and preferably to a value of approximately 3.5, is most effective for stable operation in an electrodialysis system contemplated herein.

Other solutions such as naturally occurring waters, the preferred pH for stable operation would be different, as for example, naturally occurring waters a pH of about 5 to 7, preferably 6 to 6.5, would produce the most desired stable operating conditions due to the resulting suppressed ionization of the bicarbonates originally present in said waters.

In the case of sugar solutions for example, the addition of acid thereto causes the amphoteric electrolytes (amino acids) to ionize into sodium phosphates, sulphates and chlorides which are strong electrolytes and migrate freely through the membranes, and color acids which are weak electrolytes and are suppressed in their tendency to migrate in the solution. In the case of naturally occurring waters which contain bicarbonates the addition of acid thereto forms sodium, calcium, magnesium, chlorides, sulfates, etc., which are strong electrolytes and migrate freely through the membranes, and carbonic acid which is a weak electrolyte and its migration in solution is suppressed.

Various means have been proposed in the literature to at least partially alleviate the fouling of membranes in electrodialysis systems; for example, increased rate of flow of the concentrating stream in conjunction with extra width of the concentrating chambers to effect the flushing out of precipitates with agitated flow of liquid passing therethrough, contacting the solution with activated charcoal or carbon, in treatment with phosphoric acid and excess of lime to produce a floc, addition of sulfuric acid to the diluting stream of a multichamber electrodialysis unit with the chambers therein alternating as concentrating and diluting chambers in amounts sufficient to neutralize the same (pH 7), Industrial and Engineering Chemistry, vol. 47, No. 1, January 1955, Walters et al., or removal by precipitation of polyvalent anion salts in the solution before entering the demineralizer. None of the methods indicated above, however, has proven completely efficacious or effective in preventing the fouling of the membranes in electric membrane demineralizing systems. It will also be understood that in many cases of industrial importance, the inclusion of such expedients as defecation step before demineralization renders the process uneconomical.

It was also known to minimize pH changes in an organic solution to be purified in an electrodialyzing unit consisting of an anode chamber, a single diluting chamber, and a cathode chamber defined between nonselective ion permeable membranes. This provided for the addition of an alkali or acid to the anodic and cathodic washing liquids to such an extent as to insure that equal quantities of hydrogen and hydroxyl ions migrate into the central diluting chamber to prevent changes of pH therein. Such a procedure was intended to actually prevent pH changes in the diluting chamber to result in an acid pH and to the effect of transferring different quantities of hydrogen and hydroxyl ions into the central diluting chamber to prevent changes of pH therein. Furthermore, this procedure did not prevent large or polymeric ions present in the diluting central chamber from fouling the membrane surfaces thereof or to prevent the transfer of such ions into the concentrating chambers which could cause precipitation in the concentrating chambers or within the confining membranes themselves.

It has been found that acid addition to the concentrating and/or the diluting stream on a batch or continuous basis to lower the bulk pH of these streams even by one unit would allow increased salt transfer rates without scaling, imbedding, and fouling of the anion membrane surfaces. In the case of solutions containing appreciable quantities of iron (for example, dextrose hydrolyzates, sugar solutions, blackstrap molasses, etc.), the pH of the concentrating and/or the diluting streams should be kept at low values in the range of 1 to 5 and preferably about in the range of 2 to 3.5. In the treatment of natural waters such as brackish, sea waters, etc., where the principal susceptible species is calcium carbonate, reduction of the pH of the concentrating and/or the diluting stream from its neutral value of about 7 to a value of about 6.5 to 6, or even 5, increases calcium solubility many-fold and permits the use of much higher currents without membrane fouling. The acid may consist of hydrochloric, sulfuric, citric, etc., which may be gradually added to the concentrating or diluting feed streams (usually tap water or other available aqueous liquids) either before or during its passage through the concentrating and/or diluting chambers of the demineralizer. Such systems of demineralization may be either batch, recirculating, or staging in accordance with the results sought.

The primary object of the invention is to stabilize the operation of demineralization of aqueous solutions in the electrodialysis of the same in multi-chamber systems having spaced alternately anion and cation permselective membranes.

Another object of the invention is to prevent the fouling of the ion-exchange (anion) selective membranes in the systems of the instant case.

A further object of the invention is to increase the efficiency of demineralization.

A further object of the invention is to stabilize and minimize the resistance of the demineralizer to utilize more efficiently the highest current density therein.

Another object of the invention is to control and minimize the power input to the end that the process of demineralization is more economical.

These and other objects and features of the invention will be more readily understood and appreciated from the following detailed description of preferred embodiments thereof selected for the purpose of illustration, as shown in the accompanying drawings in which:

FIGURE 1 is a schematic representation of a continuous recirculation unit used in performance of stability tests on syrups and juices and naturally occurring waters such as brackish and sea waters wherein acid adjustment is effected in the feed diluting stream;

FIGURE 2 is a graph which shows the results in the relation between voltage and time of operation for 30° Brix cane molasses with and without acid adjustment in the streams of a multi-chamber electrodialyzing unit for a current of 90 ma./cm.$^2$ in the recirculating unit of FIGURE 1.

Figure 3:
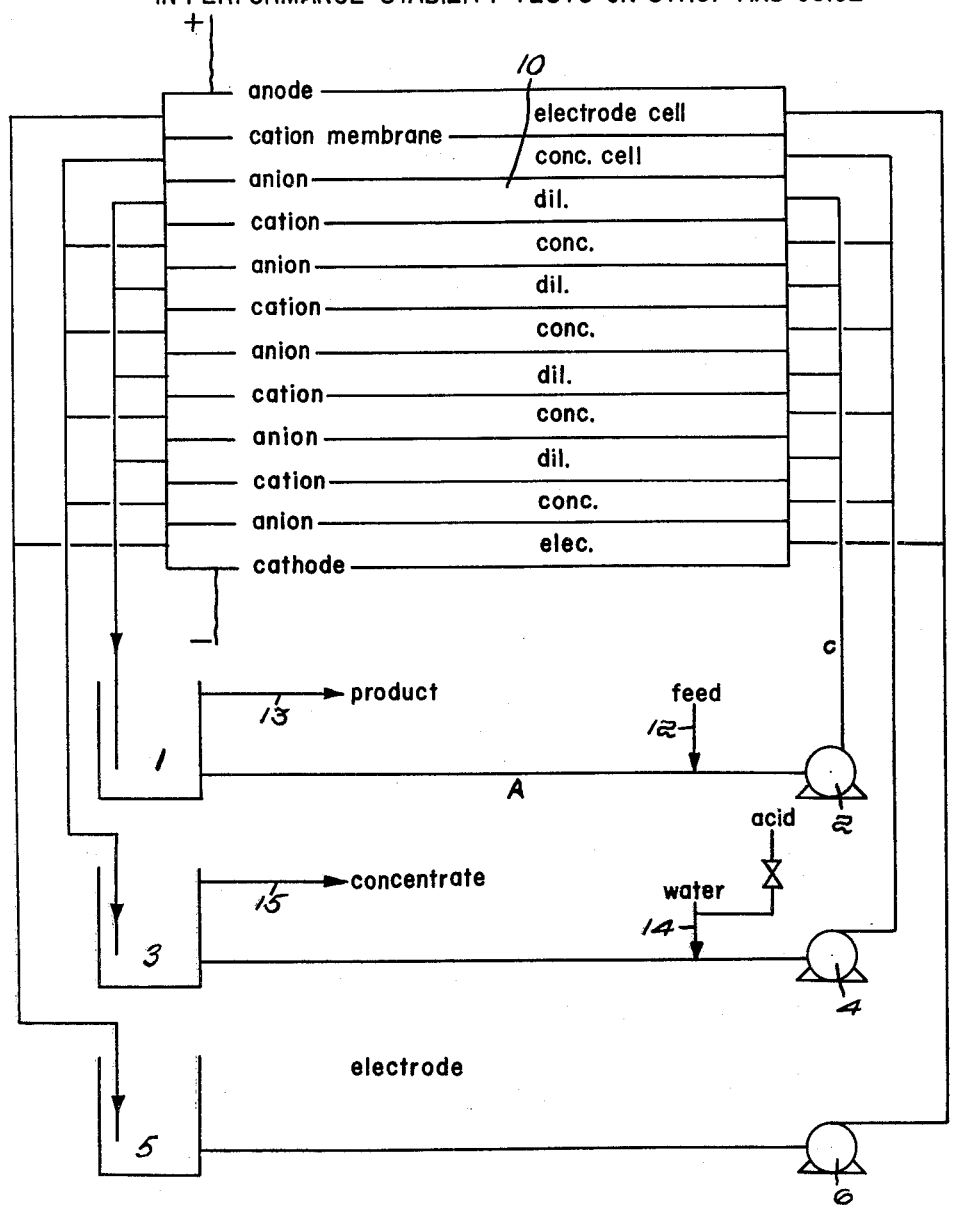
FIGURE 3 is a schematic representation of a continuous recirculation unit of the present invention wherein the acid adjustment is effected in the concentrating stream.

As an example of the effects described above, black strap molasses is fed continuously to the demineralizing system shown in FIGURE 1 at a fixed flow rate and recirculated through the demineralizer. The feed product stream (in this case, black strap molasses) is introduced to the system at 12, recirculated by means of pump 2 and thence through the diluting chambers, after which it is returned to the reservoir 1 and further recirculated as indicated by the arrows. The product is continuously removed by overflow 13 in reservoir 1 and compensated by continued feed of feed molasses at 12. A similar procedure is used with the concentrate stream entering at 14 which, in this case, is tap water. The concentrating stream (tap water) is circulated through the demineralizer concentrating chambers by pump 4 and then into reservoir 3 where it is continuously recirculated through the system and eventually continuously removed through overflow 15 in reservoir 3 as a waste stream. Waste stream 15 is continuously compensated by a continuous influent of feed water at 14. The electrode compartments are fed with a recirculating stream of a buffered acid from reservoir 5, by pump 6 through the demineralizer 10, and back to reservoir 5. The addition of acid to the electrodialyzing or dilute stream is provided for at 14 to maintain the pH in said stream at the required level of about 1 to 5.

As an example of the effects described above, cane sugar black-strap molasses was fed continuously to the system shown in FIGURE 1 at a fixed flow rate and recirculated through a demineralizer. Under such conditions at constant molasses feed rate, current and temperature, there should be no variation of voltage required and of salt transfer except that due to fouling of the membranes. The molasses stream was introduced to the system at 12, circulated (FIGURE 1) by means of a pump 2 and thence through the diluting chambers, after which it was returned to the reservoir 1 and further recirculated. The product is removed by overflow 13. A similar procedure was used with the concentrate stream which was fed with tap water 14, through the system by pump 4 and into reservoir 3, recirculated through the demineralizer 10 and back to reservoir 3, and eventually removed through overflow 15. The electrode compartments were fed with a recirculating stream of a buffered acid from reservoir 5, by pump 6 through demineralizer 10, back to reservoir 5. The velocity of the molasses stream was 20 cm. per second, the temperature was 60° C., and a current density of 20 ma./cm.$^2$ was applied. The specific conductivity of the effluent molasses was 40% of the influent feed solution. The voltage drop per cell pair was plotted against time under these conditions. The molasses used had the following analysis:

Solids _____ 27%
Brix spindle _____ 30°
Sucrose _____ 11%
Invert _____ 10%
Sulfate ash _____ 2.6%

The curves in FIGURE 2 summarize the effects obtained as follows:

Curve A represents the curve of untreated (no acid added) 30° Brix molasses having a pH of 7.0.

Curve B represents the curve in which the molasses was adjusted to a pH of about 3.5 with hydrochloric acid added at 16 with valve 17 partially open (FIGURE 1).

It is seen from this graph that stable operation was readily achieved by the addition of acid to pH 3.5. A pH in the range of about 1 to about 5 proved to be almost as effective.

It will be noted that in the anodic chamber of the demineralizer of the present case, the reaction of the migrating anions to the anode electrode form acid constituents in the anode chamber. Use of this anodic acid solution can, if desired, be economically made by employing the anodic acid effluent as the acid addition to the feed streams of the process described herein.

It will be apparent that naturally occurring waters, such as brackish or sea water, may be employed as the feed stream instead of the black strap molasses as indicated above, but in this case the pH of said diluting stream is preferably maintained below 6.5.

As a further example of the effects described above, naturally occurring brackish water is fed continuously to the demineralizing system shown in FIGURE 3 at a fixed flow rate and recirculated through the demineralizer, like numerals denoting like parts as referred to in FIGURE 1. The feed product stream (in this case, brackish water) is introduced to the system at 12, recirculated by means of pump 2 and thence through the diluting chambers, after which it is returned to the reservoir 1 and further recirculated as indicated by the arrows. The product is continuously removed by overflow 13 in reservoir 1 and compensated by continued feed of raw water at 12. A similar procedure is used with the concentrate stream entering at 14 which, in this case, is tap water. The concentrating stream is circulated through the demineralizer concentrating chambers by pump 4 and then into reservoir 3 where it is continuously recirculated through the system and eventually continuously removed through overflow 15 in reservoir 3 as a waste stream. Waste stream 15 is continuously compensated by a continuous influent of tap or feed water at 14. The electrode compartments are fed with a recirculating stream of a buffered acid from reservoir 5, by pump 6 through the demineralizer 10, and back to reservoir 5. The addition of acid to the waste or concentrating stream is provided for at 14 to maintain the pH of said stream at the required level of below 6.5. It will be apparent that aqueous organic solutions such as sugar solutions may be employed as the feed stream instead of the naturally occurring waters as indicated above, but in this case, the pH of said concentrating stream is preferably maintained between about 1 and about 5.

The following examples further illustrate the invention.

EXAMPLE 1

A membrane demineralizer of the type described above, operating in the field, was fed with a natural water of composition indicated below, producing product and waste streams with compositions indicated in columns 2–4 in Table I.

Operation of the unit under these conditions over a three-week period resulted in severe imbedding and encrustation of anion-selective membranes of the unit so that the operating voltage requirement increased from 160 volts to about 300 volts, the limit of the power supply available.

At this point, pH adjustment to a level of 6.5 in the concentrate or waste stream, at 14, was instituted by addition of 3 pounds of concentrated $H_2SO_4$ per 1000 gallons to the concentrate feed, with no other changes in the system. Over the next three-week period, the encrustation and imbedding of the membranes substantially disappeared, and the operating voltage requirement returned to 160 volts. Since that time, the particular field installation operated for six months on the same supply at the same pH adjusted concentrate stream level, with no recurrence of encrustation or imbedding of the membranes, producing substantially the same product water and a waste stream with the composition indicated by column 5 in the Table I below.

Table I

| 1 | 2 | 3 | 4 | 5 |
|---|---|---|---|---|
| | Feed, p.p.m. | Product, p.p.m. | Waste without pH adjustment p.p.m. | Waste with pH adjustment, p.p.m. |
| Na | 606 | 55 | 1,350 | 1,350 |
| Ca | 445 | 10 | 1,120 | 1,120 |
| Mg | 180 | 5 | 500 | 500 |
| $SO_4$ | 1,040 | 51 | 2,550 | 2,850 |
| Cl | 1,290 | 44 | 3,100 | 3,100 |
| $HCO_3$ | 360 | 62 | 750 | 400 |
| pH | 7.1 | 6.4 | 7.4 | 6.5 |

EXAMPLE 2

A membrane demineralizer described above operating in the field was fed with a natural water of composition indicated in Table II, producing product and waste streams with composition indicated as follows:

*Table II*

|  | Feed | Product | Waste |
| --- | --- | --- | --- |
| Na | 640 | 122 | 1,340 |
| Ca | 255 | 10 | 600 |
| Mg | 100 | 4 | 225 |
| $SO_4$ | 640 | 65 | 1,400 |
| Cl | 1,100 | 125 | 2,500 |
| $HCO_3$ | 175 | 65 | 315 |
| pH | 7.2 | 6.8 | 7.3 |

Operation of the unit under these conditions over a three-month period required weekly disassembly and manual removal of encrusted precipitate adhering to anion membranes. The weekly cleaning and disassembly occupied about twenty hours for a six hundred cell plant, and the manual cleaning ruined about ten membranes in this size plant on each disassembly. Adjustment of the waste stream pH level to 6.3 by addition of HCl to the water concentrate feed supply was instituted. The acid requirement was 3 pounds of 35% HCl per 1000 gallons of feed concentrating water under the above conditions.

Over the next three-month period, no further disassembly of the membrane stacks was required. At that time, lack of acid in the field necessitated operation without pH adjustment for a period of three weeks, during which voltage requirements increased so that manual cleaning was required at weekly intervals. When pH adjustment was reinstituted, no further cleaning was necessary. Actual concentration of ionic species is indicated in Table III below for pH-adjusted operation.

*Table III*

|  | Feed | Product | Waste |
| --- | --- | --- | --- |
| Na | 640 | 122 | 1,340 |
| Ca | 255 | 10 | 600 |
| Mg | 100 | 4 | 225 |
| $SO_4$ | 640 | 65 | 1,400 |
| Cl | 1,150 | 130 | 2,600 |
| $HCO_3$ | 100 | 40 | 180 |
| pH | 6.6 | 6.5 | 6.7 |

EXAMPLE 3

A membrane demineralizer as noted above operating in the field was fed with a natural water of composition indicated below, producing product and waste streams with compositions indicated as follows:

|  | Feed | Product | Waste |
| --- | --- | --- | --- |
| Na | 230 | 140 | 230 |
| Ca | 200 | 60 | 340 |
| Mg | 120 | 36 | 200 |
| $SO_4$ | 480 | 190 | 780 |
| Cl | 520 | 170 | 860 |
| $HCO_3$ | 300 | 180 | 420 |
| pH | 7.5 | 7.2 | 7.6 |

Operation of the unit under these conditions over a one-year period required biweekly cleaning of membranes for removal of encrustation and replacement of severely imbedded membranes. In this case, as in the earlier examples, removal of surface encrustation did not relieve internal imbedded material which weakened the membranes, and allowed several to burst under hydrostatic differentials.

Adjustment of the pH to 6.0 of the water fed to the diluting chambers removed the imbedding and allowed continued operation for a second year with substantially no further difficulty due to solids formation within the cell.

The following examples demonstrate the comparison of the operating resistance of electrodialysis systems using 30° Brix blackstrap molasses at three different pH values when acid is added to the diluting feed stream.

EXAMPLE 4

The electrodialysis of dextrose solution (reconverted greens) was conducted using tap water of a pH of 8 in the concentrating stream. The use of tap water resulted in precipitate in the concentrating stream, increased resistance, and rapid fouling membranes when a current density of 15 ma./cm.² was exceeded. When $$0.03 N H_2SO_4$$

(a resulting pH of about 2) was used in the concentrating stream, no precipitation occurred, and steady unit resistance was noted in a run which was carried out for 29 hours at 22 ma./cm.² and for 5 hours at 33 ma./cm.². The operating conditions of Example 2 and Example 4 were as follows:

Demineralization ___ 50%.
Dilute stream _____ Argo reconverted greens at 12° Bé.
Solution linear velocity _____ 45 cm./sec.
Temperature _____ 60° C.

EXAMPLE 5

(A) All the experiments below were run at a current density of 20 ma./cm.², 60° C., a linear velocity of 15–17 cm./sec., and a demineralization of 55%–70%. The acid used for adjusting pH was HCl. The stream to the concentrating chambers was tap water.

| Run | pH Feed | Time Operation, hours | Resistance per Cell Pair, Ω | | Percent Increase |
| --- | --- | --- | --- | --- | --- |
|  |  |  | at 1 hour | Final |  |
| J | 3.5 | 4.5 | 0.22 | 0.22 | 0 |
| L | 4.5 | 5.0 | 0.67 | 1.07 | 60 |
| K | 5.7 | 4.0 | 0.67 | 1.56 | 133 |

Molasses at a pH of 3.5 gave the best results, followed by pH 4.5 and 5.7, in that order.

(B) The electrodialysis of dextrose solutions: The example below represents an electrodialysis experiment using as the dilute feed stream hydrolyzate (dextrose solution) at 12° Bé, having a pH of approximately 2 in $H_2SO_4$. The concentrating stream was tap water (with a pH of approximately 2 in $H_2SO_4$). The conditions of the run were as follows:

Current density _____ 7 ma./cm.².
Temperature _____ 60° C.
Dilute linear flow _____ 45 cm./sec.
Feed flow _____ 10 ma./cell pair.

This run operated for 40 hours at a constant resistance of 1.3 ohms per cell pair, indicating a stable, non-fouling performance.

It will thus be evident that stable operation was readily achieved in all cases by the addition of an acid to the concentrating and/or diluting streams to pH levels below 7, in the case of aqueous solution containing minor quantities of inorganic salts, such as naturally occurring waters, preferably below a pH of 6.5, and in the case of aqueous organic salt solutions, preferably a pH of from about 1 to about 5.

What we claim is:
1. The method of preventing fouling of anion selective membranes in the demineralization of aqueous solutions containing minor quantities of inorganic salts to be removed therefrom and constituents which are susceptible of fouling anion selective membranes comprising: passing said solution as a diluting stream through the diluting chambers of an electrodialysis unit having a plurality of concentrating and diluting chambers defined between alternate anion selectively permeable and cation selectively permeable membranes, passing a second aqueous solution as a concentrating stream through the alternate concentration chambers, adding acid to the influent concentrating stream sufficient to maintain the pH of said stream below 6.5 throughout its course through said concentration chambers and passing a direct current in series transversely through said membranes and aqueous streams to effect dilution and concentration of said alternate streams.

2. The method of claim 1 wherein both concentrating and diluting streams are recirculated through the demineralizer to effect a predetermined degree of demineralization.

3. The method of claim 1 wherein the aqueous solution is a natural occurring water and the pH of the concentrating stream is maintained between about 5 and 6.5.

4. The method of preventing fouling of anion selective memberanes in the demineralization of aqueous solutions containing minor quantities of inorganic salts to be removed therefrom and constituents which are susceptible of fouling anion selective membranes comprising: passing said solution as a diluting stream through the diluting chambers of an electrodialysis unit having a plurality of concentrating and diluting chambers defined between alterate anion selectively permeable and cation selectively permeable membranes, passing a second aqueous solution as a concentrating stream through the alternate concentration chambers, adding acid to the influent diluting stream sufficient to maintain the pH of said stream of about 6 throughout its course through said diluting chambers and passing a direct current in series transversely through said membranes and aqueous streams to effect dilution and concentration of said alternate streams.

5. The method of claim 4 wherein both concentrating and diluting streams are recirculated through the demineralizer to effect a predetermined degree of demineralization.

6. The method of claim 4 wherein the aqueous solutions are natural occurring waters and the pH of the diluting stream is maintained between about 5 and about 6.

7. The method of preventing fouling of anion selective membranes in the demineralization of aqueous organic solutions containing minor quantities of inorganic salts to be removed therefrom and constiuents which are susceptible of fouling anion selective membranes comprising: passing said solution as a diluting stream through the diluting chambers of an electrodialysis unit having a plurality of concentrating and diluting chambers defined between alternate anion selectively permeable and cation selectively permeable membranes, passing a second aqueous solution as a concentrating stream through the alternate concentration chambers, adding acid to the influent concentrating stream sufficient to maintain the pH of said stream between about 1 and 5 throughout its course through said concentration chambers and passing a direct current in series transversely through said membranes and aqueous streams to effect dilution and concentration of said alternate streams.

8. The method of claim 7 wherein both concentrating and diluting streams are recirculated through the demineralizer to effect a predetermined degree of demineralization.

9. The method of claim 7 wherein the organic solution is an aqueous sugar solution and the pH of the concentrating stream is maintained between 2 and 3.5.

10. The method of preventing fouling of anion selective membranes in the demineralization of aqueous organic solutions containing minor quantities of inorganic salts to be removed therefrom and constituents which are susceptible of fouling anion selective membranes comprising: passing said solution as a diluting stream through the diluting chambers of an electrodialysis unit having a plurality of concentrating and diluting chambers defined between alternate anion selectively permeable and cation selectively permeable membranes, passing a second aqueous solution as a concentrating stream through the alternate concentration chambers, adding acid to the influent diluting stream sufficient to maintain the pH of said stream between about 1 and 5 throughout its course through said diluting chambers and passing a direct current in series transversely through said membranes and aqueous streams to effect dilution and concentration of said alternate streams.

11. The method of claim 10 wherein both concentrating and diluting streams are recirculated through the demineralizer to effect a predetermined degree of demineralization.

12. The method of claim 10 wherein the organic solution is an aqueous sugar solution and the pH of said diluting stream is maintained between 2 and 3.5.

References Cited in the file of this patent

UNITED STATES PATENTS 2,671,055   Aten et al. _____ Mar. 2, 1954

FOREIGN PATENTS 682,703   Great Britain _____ Nov. 12, 1952

OTHER REFERENCES

Walters et al.: Industrial and Engineering Chemistry, vol. 47, No. 1, January 1955, pp. 64–65.

Langelier: Journal A.W.W.A., September 1952, pp. 845–848.